March 17, 1964  F. G. LAMB  3,125,233
POTATO CELLAR LOADER
Filed May 11, 1961  3 Sheets-Sheet 1
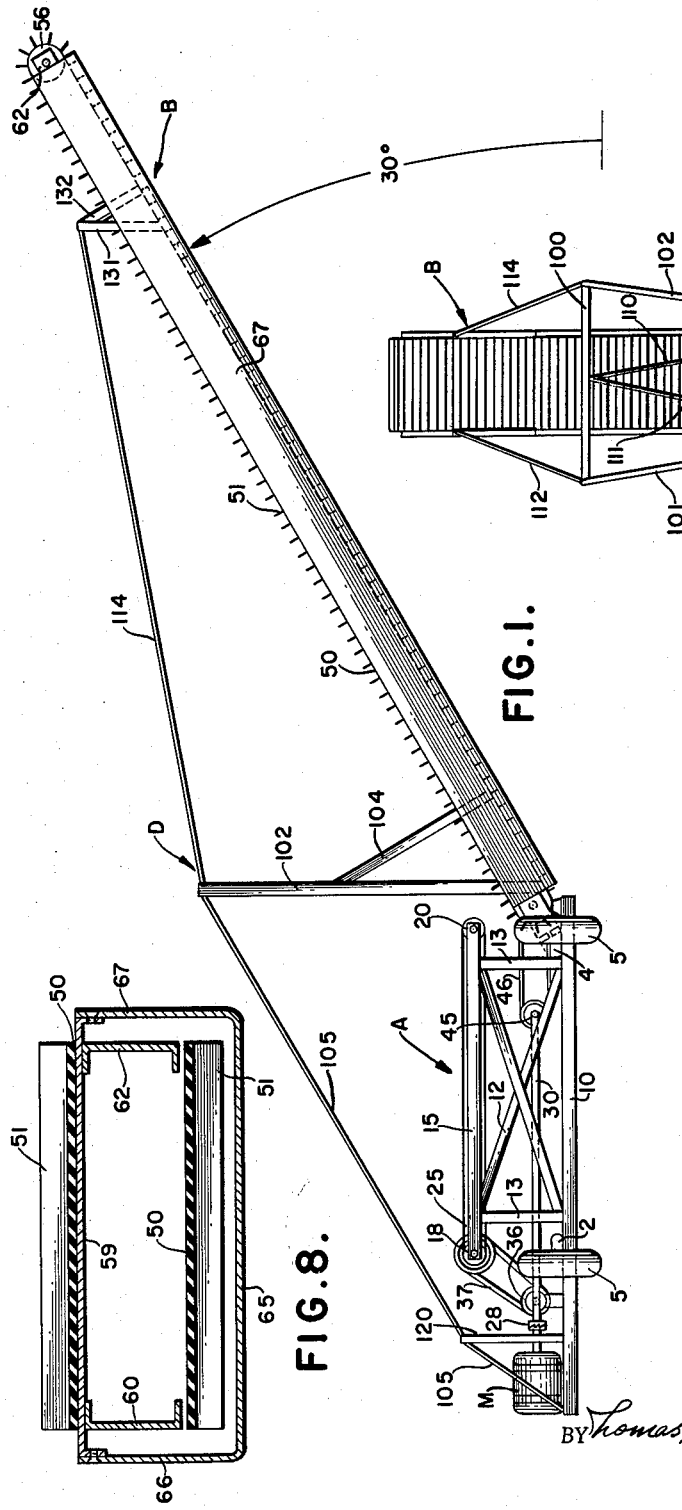
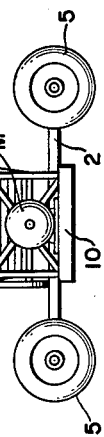
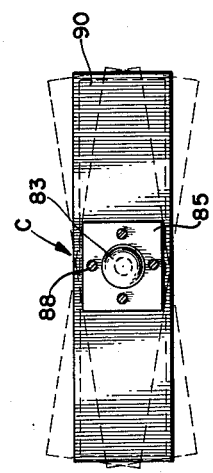
INVENTOR
Frank G. Lamb
BY Thomas, Weisman & Russell
ATTORNEYS March 17, 1964  F. G. LAMB  3,125,233
POTATO CELLAR LOADER
Filed May 11, 1961  3 Sheets-Sheet 2
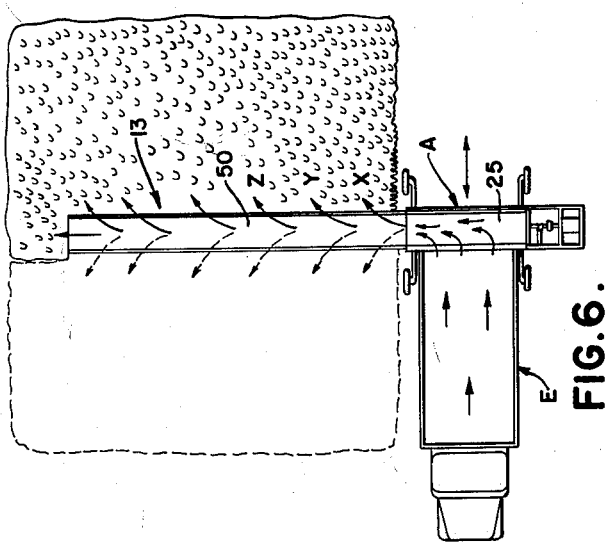
FIG. 7.
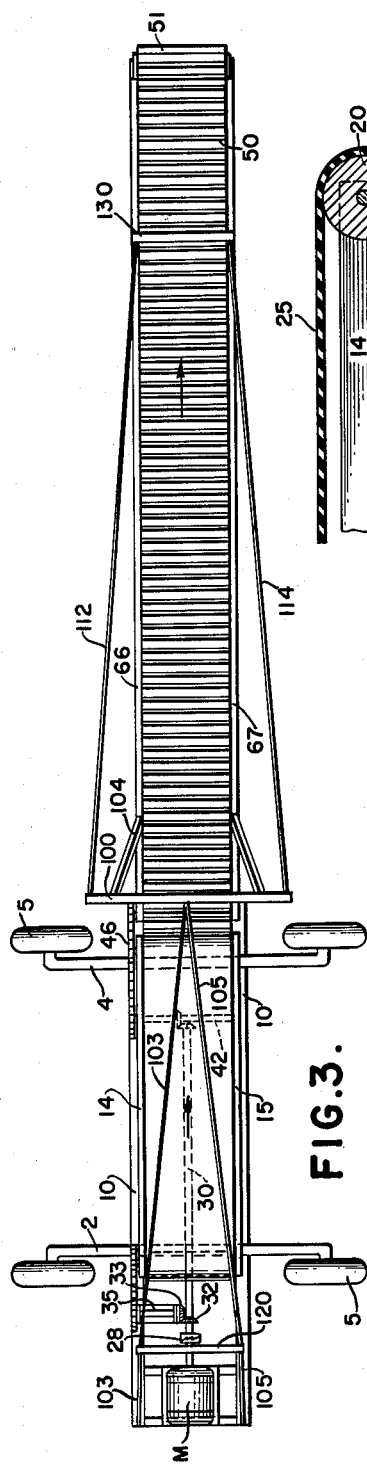
FIG. 3.
FIG. 6.
INVENTOR
Frank G. Lamb
BY *Thomas, Weisman & Russell*
ATTORNEYS March 17, 1964

F. G. LAMB 3,125,233

POTATO CELLAR LOADER

Filed May 11, 1961

INVENTOR
Frank G. Lamb

BY Thomas, Weisman & Russell

ATTORNEY

United States Patent Office 3,125,233
Patented Mar. 17, 1964

3,125,233
POTATO CELLAR LOADER
Frank Gilbert Lamb, Milton-Freewater, Oreg., assignor to Lamb-Weston, Inc., a corporation of Oregon
Filed May 11, 1961, Ser. No. 109,298
5 Claims. (Cl. 214—152)

This invention relates to a means and method for the stacking of large amounts of potatoes in a relatively compact but large pile. More particularly, the invention is directed to an inclined conveyor type of arrangement, the angled conveyor portion of which is tiltable laterally to either side so as to permit the discharge of conveyed potatoes from the low side, thus forming a stack of potatoes on that low side of ever increasing height. In this method, the stack itself prevents dropping of the product any appreciable distance. Once the stack has reached the full height of the conveyor at its outby end, the conveyor being angled upwardly, the process is repeated so that there is no limit, except as limited by the size of the equipment and other practical considerations, as to the size of the entire stack, or mound, of the product.

The combination of the invention is designed for use where the bulk of the involved product is measured by considerable tonnage, the arrangement nevertheless affording rapid, largely automatic and efficient stacking without product damage.

In any stacking procedure relating to a food product there is the ever present hazard of damage to the product, and this is also particularly true with respect to potatoes which must be so handled that they are not dropped, consequently bruised and thereby deteriorated for other subsequent processing.

The present concept is directed to a handling procedure, particularly stacking, where damage to the product is materially minimized or completely eliminated, but accomplished easily, rapidly and efficiently.

Although it is well known that the tuber is easily damaged by being bruised or cut by falling any appreciable distance upon a hard surface or by impact upon others of the same product, present day stacking practices do not involve procedures assuring stacking without product damage. This is because prior art procedures contemplate the use only of elevated conveyors wherein the operation involves merely conveyance of the product to the top of the conveyor and discharge thereof from the high point. The result is a full drop to the floor or ground in commencing the stack; and even after a pile is so started the product is then permitted to slide down the full stack with an impact of almost equal force. The result, in either case, is serious product damage.

Aside from product preservation, it is also of the essence that any automatic or semi-automatic machinery proposed for accomplishing the purposes herein outlined be easily handled and readily manipulated, and, as well, of relatively low cost for acceptance commercially.

In these respects the instant mechanism fulfills such desiderata, a primary objective of the invention being the provision of a stacking method whereby a load of the given food product, such as potatoes, is directly received from the truck and rapidly and efficiently stacked in relatively large heaps without bruising, mashing, cutting or causing other material damage to the product.

In line with the foregoing, a further object of the invention is to provide a means and method which in the course of the so-called stacking of the potatoes, or any other product, limits the amount of fall, if any, to only a small distance of a few inches so that no damage occurs in the course of this procedure.

Thus the apparatus of the invention permits gradual increase in the size of the stack, the stack itself preventing the falling of the product from the conveyor until the same has reached the top of the pile, and ever at that point, the drop is small and non-damaging.

Another object of the invention is the provision of a conveyor means which is laterally tiltable throughout its length, either to the right or left, so that such stacking conveyor discharges the product from either the right or left side as may be desired, the conveyor flights being open sided or permitting discharge of the product between flights when the stack itself does not obstruct such discharge.

An additional object of the invention is the provision of a device of this general description wherein the discharging and tiltable conveyor is pivoted at its lower end and provided with suitable apparatus which permits of its being angled upwardly from the horizontal to any desired and workable degree. When the conveyor is so positioned, and the conveyor belt itself tilted to one side and locked in such tilted, elevated position, the result, as stated above, is to carry the product upwardly without discharge and consequent drop, for the stack itself as it reaches the top of the conveyor does not permit outward discharge of the potato until the top of the pile is reached. And when discharge does occur, the amount of fall is small and non-damaging.

As intimated in the foregoing, it is also an objective of the invention to provide portable equipment of this nature which is easily movable and directly engages the tailgate of the truck conveying the potatoes to the apparatus. The assembly can thus be positioned at any location along the pile by such truck, so that the stacking procedure is easily and continuously performed and can be repeated until the desired size of the mound or stack has been reached.

With such objectives in view, as well as other advantages and objects which will be apparent to those skilled in the art, my invention will now be described in more particular with reference to the following drawings, wherein like numerals refer to like component parts, and wherein:

FIGURE 1 is a side elevation view of the invention with the conveyor in elevated position but having no lateral tilt;

FIGURE 2 is an end elevation view of the invention as shown in FIGURE 1;

FIGURE 3 is a top plan view of the invention as shown in FIGURE 1;

FIGURE 6 is a diagrammatic view indicating the position of the truck when directly discharging potatoes to the horizontal, unloading draper, and also indicating the gradual build up of a stack of the product due to the slant or inclination of the conveyor toward either one side or the other;

FIGURE 7 is a detail view, partially in section, illustrating the drive and vertical pivoting means for the main, cleated conveyor, as well as the ball and socket interconnection for same permitting tilt of such conveyor in any amount and in either direction;

FIGURE 8 is a section view taken on the line 8—8 of FIGURE 7; and

FIGURE 9 is a section view on the line 9—9 of FIGURE 7.

Figure 4:
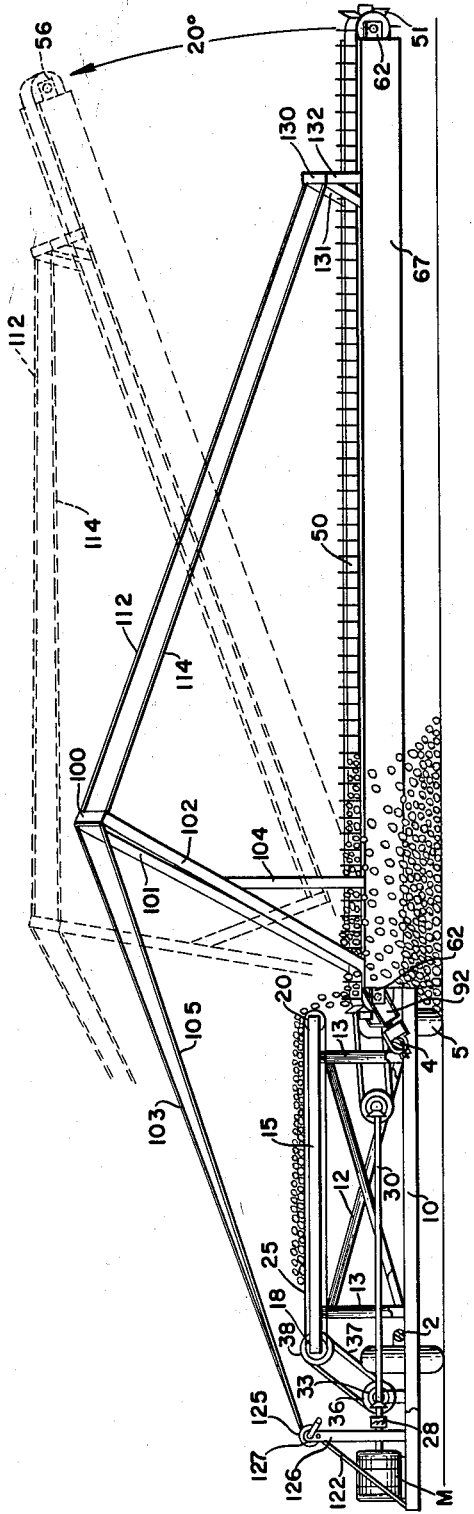
FIGURE 4 is a view similar to FIGURE 1 but illustrating the manner in which the conveyor is elevated a predetermined amount from the horizontal (as here shown, an angle of about 20°) and also demonstrating the manner by which tilting of the conveyor to one side causes discharge of the product upon that lower side.

Referring to these several figures, it will be appreciated that there are actually several cooperating aspects of the over-all assembly. For example, the horizontal unloading draper assembly is generally indicated at A, this so-called draper picking up the product directly from the truck which discharges same. The horizontal draper feeds the product to the stacking, flight conveyor, generally indicated at B, for ultimate discharge between flights at gradually increasing heights as the pile of product is gradually increased in height. The assembly permitting tilting of the flight or cleated conveyor is generally indicated at C, this tilting functionally obtaining the real objective of the invention—gradual build up in height of the stack without the possibility of dropping of the product any appreciable distance. The fourth contributory arrangement of the invention is found in the gallows frame supporting the stacking draper, generally indicated at D, which permits maintaining a predetermined angle of the flight conveyor with respect to the horizontal, and also enables altering of such angle to any desired degree to suit different stacking requirements for different types of product. Finally, the portability of the unit is indicated by the relationship of the truck E to the remainder of the assembly, the truck directly unloading upon the horizontal draper, and also attached to the frame of the latter, when desired, to enable movement of the stacker along the pile of product in a manner to be described.

Referring to FIGURE 1, it is seen that the entire mechanism is movably supported up on a trailer type arrangement. This consists of appropriate frame members 2 and 4 which are supported at either end by suitable wheels 5. A subframe 10 having end elements 11 is affixed in any suitable manner to these frame members 2 and 4, and a surmounting framework 12, inclusive of suitable stanchions 13, is attached to said subframe 10. The side elements 14 and 15 of the unloading draper rest upon the supporting and bracing elements 12 and the stanchions 13.

The unloading draper consists of two end reels or rolls 18 and 20 upon which rides the belt conveyor itself, 25, which may be of a rubber or composition material and which of course is provided with take-up means for tightening or placing stress upon the belt 25.

The motor M is preferably of the variable speed type so that the speed of drive of both the draper mechanism and the flight conveyor, preferably but not necessarily driven in unison, may be easily regulated.

Such motor M, through a suitable universal joint 28, drives a shaft 30 upon which is mounted a bevel gear 32 which is intermeshed with a complementary bevel gear 33. The latter is mounted upon a stub shaft 35. This stub shaft in turn rotates the drive sheave 36 and the latter, through the drive belt 37, provides power for the drive pinion 38, the latter being directly keyed to and rotating the end reel 18 and hence the horizontal draper belt 25.

The main shaft 30 extends rearwardly to a point where, through suitable intermeshed bevel gears 40 and 41, drives the rear stub shaft 42. The drive pinion 45, keyed to shaft 42, represents the main drive for the flight conveyor mechanism. As seen in FIGURE 7 this pinion 45 engages the drive pulley 48 through the usual belt 46.

The traveling conveyor for upward lift of the product consists of leather, rubber or composition belting 50, which is provided with spaced flights 51 fabricated integrally with the belt material or secured thereto in any known manner. The belt of this flight conveyor or cleated, stacking draper is mounted at its inby end upon a drive pulley 55 which is keyed to a shaft 57 and the latter fixed with relation to the drive wheel 48; at its opposite end the flight conveyor is mounted upon the idler pulley 56, the latter being rotatably disposed upon a shaft journaled in the supporting channel irons 60, 62.

The flight conveyor B rides upon a flight bed 59 (FIGURE 8) and the latter is supported upon the two longitudinal frame elements 60 and 62, which are disposed in parallel relationship with each other and form the main frame for conveyor B as will be understood by reference to FIGURE 8.

The return flights of the stacking conveyor are protected by a sheet metal shield or enclosure formed by bottom plate 65 and the two side plates 66 and 67, all made integrally, and secured to the bed plate 59 either by bolting (as shown), welding or other suitable media. The purpose of this shield is to prevent abrasive contact between the return belt of conveyor B and the product.

Figure 5:
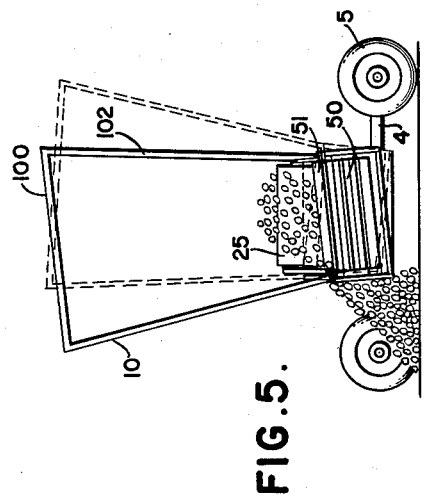
FIGURE 5 is an end view of the invention as seen from the outby or discharge end of the conveyor as it is shown in FIGURE 4 and similarly depicting the discharge of the potatoes from the low side of the conveyor mechanism, the dotted lines indicating how the tilt can be accomplished to the same degree in an opposite direction.

It is thus seen that potatoes being carried upwardly by the flights 51 are free to be discharged through the open flights from either side of the conveyor, depending upon the direction of tilt to either right or left as shown in FIGURES 5 and 9; whereas the lower flights are completely covered by the plate construction 65, 66 and 67, so that the return cleats do not intercept the product during the stacking procedure.

This conveyor belt 50 may be provided with a suitable take-up mechanism, shown here as merely a slot 75 in each of the bed supporting elements 60 and 62, so that the shaft 57 can be reciprocated to such extent as to place the required tension upon the conveyor belt 50. When located in the proper position any type of suitable means can be utilized for securing shaft 57 at that point. Equivalent take-up mechanism can be used for adjusting the slack or tension upon the belt 46 due to commensurate adjustment of the shaft 57. At any rate, it is to be understood that certain adjustments as these may be necessary when the conveyor B is tilted in either direction, or when the longitudinal angle of inclination is altered.

The stacking flight conveyor is adjusted to its desired vertical angle through a pivot means, provided at its lower end, and interconnected with the subframe 10 as shown in FIGURE 7. This interconnection takes the form of a hasp arrangement of two curved elements 78 and 81, adapted to be secured to the inboard frame element 4, and maintained in adjusted position by take up on the bolts 79. The frame element 4 thus operates as a pivot or fulcrum point for angular adjustment of the flight conveyor assembly. The hasp elements 78 and 81, having the cross-sectional configuration as shown, are welded to a pivot block 85, such pivot block 85 and the related hasp elements riding upon the shaft 4 in the manner illustrated in FIGURE 7, so that almost any degree of elevation can be obtained with respect to the cleated stacking draper.

The pivot block 85 is provided with a hemispherical depression to accommodate a ball 86 which provides for a ball and socket interconnection between this pivot block and the cleated stacking draper. The ball is retained in the position shown in FIGURE 7 by means of a clamping block 89 secured to the pivot block 85 through the usual bolts 88. The clamping block 89 is provided with a similar hemispherical or convex depression to receive the ball 86 therein. The ball 86 is formed with an extension 87 and the latter secured to an end cover 90, which end cover extends between and is attached to the two side members 66 and 67, thus supporting the inner end of conveyor B. This end cover, at top and bottom, is provided with appropriate slots 91 to accommodate the drive reel 55 of the conveyor B.

It will thus be seen that this ball and socket interconnection, as it has just been described, permits tilting to the right or left of the entire conveyor frame, much in the manner indicated in FIGURES 4, 5 and 9, so that depending upon the direction of tilt the product is discharged to one side of the conveyor during the stacking operation. For adjustment of the tilt, bolts 88 are slacked off; to retain the conveyor at a predetermined degree of tilt, such bolts are tightened as required.

As stated, means have been provided for varying the degree of angular inclination of the main conveyor frame and its related elements. For example, the stacking conveyor as shown in FIGURE 4 is parallel to the horizontal. However, for stacking purposes the stacking draper can be elevated to the desired degree, indicated to be 20° in dotted line in FIGURE 4 and about 30° in FIGURE 1. The amount of slant or incline would involve consideration of several factors: over-all size of the ultimate pile or stack, type of material being handled, rapidity of operation, degree of lengthwise angularity to the horizontal, etc.

It will bet noted that the type of pivot arrangement shown in FIGURE 7, and involving the carriage element 4 as the pivot point, is applicable to the structure of FIGURE 1. In FIGURE 4, however, and as indicated, the stacking conveyor is shown in horizontal position and may be elevated to any degree from horizontal. In order to position the conveyor to extremely small angularities to the horizontal, an additional pivot is here employed. This takes the form of a yoke member 92 having suitable bores for reception of the drive shaft 57, the latter then forming the pivot or fulcrum point of elevation of the conveyor. The conveyor in either instance is primarily supported at its predetermined angularity by means of the gallows frame and related fore and aft stays, described in the following, that secure the conveyor in such predetermined position.

At any rate, and to maintain the cleated stacking draper in the position shown, for example, in FIGURE 1 or at the preferred incline of about 30°, the gallows frame generally indicated at D is utilized. This takes the form of a top spreader 100 which is supported on each side by two upright members 101 and 102, the latter being fortified by additional elements 104 all of which are attached to the subframe or return flight enclosure members 66 and 67, and as indicated in FIGURES 1, 3 and 4.

Several stays, preferably of wire rope, are used to maintain the gallows frame, and hence the stacking conveyor, in its predetermined position; for this purpose fore stays 103 and 105 are secured to the spreader member 100 on the one hand and (as in FIGURE 1) to an additional upright 120 at the inby end of the mechanism. These stays are then further fixed to the subframe 10 in any suitable fashion. At its opposite end the spreader member 100 is similarly secured, by means of two stays or guy wires 112 and 114 to a forward spreader 130, (see FIGURES 3 and 4) the latter being supported upon either the two side elements 66 and 67 of the return flight cover or main frame members 60, 62 through additional brackets such as 131 and 132.

It will thus be seen that these stays 102 and 103 on the one hand and 112 and 114 on the other permit fixed positioning of the stacking conveyor, preferably in the relative position shown in FIGURE 1.

Means can of course be provided for increasing or decreasing this angular inclination, such being depicted in FIGURE 4. For this purpose the two fore stays 102 and 103 are wound upon a suitable winch 125, or similar apparatus, which is journaled in appropriate stanchions 126, as will be well understood. A pin 127 is suitable for locking the winch in fixed position. Since both of the fore stays are wound upon the same winch or winding reel, as shown in FIGURE 4, it is preferable that their respective point of attachment to the member 100 be at opposite corners thereof, as shown in this figure. The winch stanchions are braced by braces 122.

In any event, if this method of adjustment is used it is at once apparent that with the winding of the referred to stays upon the winch 125 the gallows frame and accompanying elements will be drawn upwardly and the stacking conveyor raised to the desired height, at which point the winch is locked in place and the stacking operation proceeded with. Reverse motion of the winch lowers the stacking conveyor.

The method of use of the invention is indicated in FIGURES 4, 5, 6 and 9, the diagrammatic indication of FIGURE 5 demonstrating alternate tilting of the stacking conveyor toward either the right or left. Obviously with the tilt toward the observer as in FIGURE 4, or the tilt to the right as in FIGURES 5 and 6, discharge of the product will take place in that direction; whereas with a reverse tilt, as a downward tilt to the left as seen in dotted line in FIGURE 6, discharge will take place toward the left.

With the apparatus in the position shown in FIGURE 1 and with the tilt in the direction shown in FIGURES 4 and 6 it will be apparent as the product is first admitted to the stacking conveyor it will not progress very far up the belt without discharge to the right. Discharge will continue at a predetermined point such as at point X (FIGURE 6) until the stack of potatoes at point X has reached the right edge of the conveyor, at which time the stack of potatoes will preclude further discharge of the product and the product will be carried farther up the conveyor to a higher point of discharge, as graphically indicated at point Y in FIGURE 6. This same procedure follows with respect to point Z, and until the charge has reached the highest point of the conveyor.

With the foregoing function of gradual discharging with gradual increase in height in mind, the practical operation of the stacking procedure is conducted as follows:

When the mechanism is utilized to start a new pile of potatoes, the product is unloaded from the truck directly upon the horizontal unloading draper. It is then dropped a few inches from the unloading draper to the elevated, cleated, stacking draper which is positioned immediately underneath the unloading draper. It being understood that the stacking draper is angled upwardly, and also that it is tilted to one side, the potatoes are picked up by the flights of the conveyor B but roll off the lower side thereof without much initial upward progress. They thus drop a few inches to the floor. When the pile on the floor builds up until it reaches that point where the potatoes are rolling sideways off the cleated draper, the pile of potatoes itself, as mentioned above, prevents additional potatoes from rolling off the conveyor at that point and thus the flow of potatoes is elevated past the top of the pile. At this point, the product again rolls off until the pile gets taller. This procedure continues until the pile, as also mentioned above, is as tall as the top of the cleated elevated draper.

At this point, the entire assembly is rolled forward, or at right angles to the travel of the draper, where the same procedure is repeated. The movement forward is preferably approximately 18 inches at a time and continues until the pile is as long as desired, at which time the assembly is moved sideways, or in a direction parallel to the draper travel, away from the pile. At this time, the cleated elevator draper is tilted a like angular inclination from the horizontal in an opposite direction, so that the discharge is opposite to the previous discharge. The potatoes are then piled in a layer about 18 inches deep along the face of the existing pile, the conveyor gradually being returned to its original position. By this maneuver it is seen that no potato drops or rolls on other stacked potatoes a distance at more than 18 inches.

This 18-inch layer on the face of the existing pile is continued until, as stated, the equipment reaches the front end of the pile due to its gradual progression, where stacking first started.

At this point the assembly is moved sideways away from the face of the pile, again approximately 18 inches, and the tilt of the stacking belt is again reversed to the same degree from the horizontal and another layer is laid down on the face of the pile.

The same method can be repeated as many times as desired until the pile reaches its maximum over-all, desired size.

It should be observed that means can be provided for permitting the stacking draper to rotate from side to side a predetermined amount. This would call for the application of a known type of universal joint to displace the ball and socket interconnections which is shown in FIGURE 7. In this type of construction not only can the cleated stacking draper be elevated or lowered to different stacking angles, but could also be pivoted at its base so that the stacking could be in an arc, from side to side, as desired.

It will thus be appreciated that I have provided a novel means and method for stacking of such food products as potatoes, where the element of possible damage to the product is, practically speaking, completely eliminated. It has been found that the tilting of the stacking conveyor should be from about 5° to about 10°, and that preferably a 9° angularity is preferred. When the mechanism is adjusted in this manner with a vertical angularity approximating that depicted in FIGURE 1, or one of about 30° to the horizontal, the product is not permitted to drop, in any event, more than about 18 inches, which slight amount would not damage, bruise or injure the product, this being especially true of potatoes.

The method and means of this invention are in sharp contrast to known types of stackers, all of which transport such a product as potatoes to the top of an elevated draper where they are permitted to drop to the floor. Starting a pile or stack this represents a fairly severe drop which does cause substantial damage to the potato. It may be noted that with respect to these known practices, even after a pile is so started, all of the potatoes (or other product), when transported to the top of an inclined draper are permitted to roll down the face of the pile to the floor. This again represents a substantial drop, resulting in severe damage to the product.

The instant invention obviates these difficulties; at the same time the equipment represents the essence of simplicity and the manner of operation of same is conducive to a stacking procedure which is accomplished with great rapidity.

It is manifest that many variations and alternatives are possible within the scope of this invention; however, it is not intended that the same be limited in any manner except as defined by the appended claims.

I claim:

1. In a method for stacking food products, the steps comprising: conveying said products upwardly in a conveying zone, said zone being disposed angularly to the horizontal, said zone being tilted to one side with respect to the upward movement of said products, initially discharging said products at said side in the lower position of said zone to form a stack of products adjacent said lower portion, and gradually discharging said products at successively greater heights with respect to said lower portion, said heights conforming to the increase in height of said adjacent stack, whereby said products form a stack approximately equal to the height of said conveying zone, and said products are prevented from falling any appreciable distance by said adjacent stack.

2. In a method for stacking food products, the steps comprising: conveying said products upwardly in a conveying zone, said zone being disposed angularly to the horizontal in an amount of from about 20° to about 30°, said zone being tilted to one side with respect to the upward movement of said products in an amount of from about 5° to about 10°, initially discharging said products at said side in the lower position of said zone to form a stack of products adjacent said lower portion, and gradually discharging said products at successively greater heights with respect to said lower portion, said heights conforming to the increase in height of said adjacent stack, whereby said products form a completed stack approximately equal to the height of said conveying zone, and said products are prevented from falling any appreciable distance by said adjacent stack.

3. In a method for stacking food products, the steps comprising: conveying said products upwardly in a conveying zone, said zone being disposed angularly to the horizontal, said zone being tilted to one side with respect to the upward movement of said products, initially discharging said products at said side in the lower position of said zone to form a stack of products adjacent said lower portion, and gradually discharging said products at successively greater heights with respect to said lower portion, said heights conforming to the increase in height of said adjacent stack, whereby said products form a first stack approximately equal to the height of said conveying zone, and moving said conveyor zone forward to the end of said first stack, and repeating said discharging steps to form a second stack next to, and of about the same height as, said first stack.

4. The method as defined in claim 3 wherein said zone is tilted in a direction opposite to said one direction and said products are discharged along the face of said second and said first stacks to the point of beginning of said first stack.

5. The method as defined in claim 3 wherein said zone is again tilted to said one side when said zone reaches said point of beginning and said products are successively distributed along the faces of said first and said second stacks.

References Cited in the file of this patent
UNITED STATES PATENTS

| | | |
|---|---|---|
| 964,429 | Johnston | July 12, 1910 |
| 1,573,998 | Ribbons | Feb. 23, 1926 |
| 1,829,198 | Speer | Oct. 27, 1931 |
| 2,529,583 | Adams | Nov. 14, 1950 |
| 2,613,832 | Ogorzaly | Oct. 14, 1952 |